Patented Oct. 21, 1941

2,260,256

UNITED STATES PATENT OFFICE 2,260,256

PRODUCTION OF DIOXIMES AND ISOXAZOLES

Samuel B. Lippincott, Terre Haute, Ind., assignor to Commercial Solvents Corporation, Terre Haute, Ind., a corporation of Maryland No Drawing. Application July 8, 1940,
Serial No. 344,371

4 Claims. (Cl. 260—307)

My invention relates to the production of isoxazoles from nitroparaffins, and to the production of dioximes as intermediate products in this process. My invention also relates to new compositions of matter comprising intermediate and final products of this process.

It has previously been known that nitroparaffins containing more than one carbon atom could be transformed to isoxazoles by the action of alkali at elevated temperatures. (Dunstan et al., J. of Chem. Soc. 59, 410). The isoxazoles produced from the lower nitroparaffins by this method are liquid products which are difficult to purify without decomposition. As a result, relatively low yields have been obtained by this process.

I have now discovered that by suitably controlling the reaction conditions, this reaction can be caused to proceed only to an intermediate stage, with the production of dioximes. These dioximes are crystalline compounds which may be readily purified, and which may then subsequently be transformed quantitatively into pure isoxazoles.

The formation of the dioximes is believed to proceed according to the following equation, although the exact mechanism of the reaction is not known:

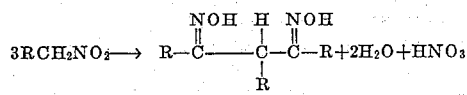

The production of the dioximes may be effected by maintaining the reaction temperature sufficiently low to prevent substantial hydrolysis of the dioxime to the isoxazole. I have found that strong alkalies have a greater tendency to promote the second stage of this reaction than weak alkalies, and that it is more difficult to terminate the reaction with the production of dioximes when strong alkalies are employed, even when using relatively low temperatures. I prefer, therefore, to utilize weaker alkaline condensation agents, and especially ammonia bases, for effecting this reaction. The term "ammonia base," as used herein and in the appended claims signifies ammonia and compounds in which one or more hydrogens of the ammonia may be substituted by neutral or basic aliphatic groups. Alkyl amines such as ethyl amine, diethyl amine, triethyl amine, propyl amines, butyl amines, and the like, are very satisfactory for this purpose. It is to be understood, however, that the alkyl amines are merely preferred alkaline condensation agents, and that other bases of equivalent alkalinity may be employed satisfactorily. The amount of alkaline condensation agent to be employed may vary within relatively wide limits. There is reason to believe that the mechanism of this reaction involves the neutralization of 1 mole of nitric acid per mole of dioxime formed. For this reason it is desirable to employ at least one-third equivalent of alkaline material per mole of nitroparaffin. An excess of a relatively weak base is not detrimental, and in general I prefer to employ at least 1 mole of an alkyl amine or equivalent alkaline-converting agent per mole of nitroparaffin.

The production of the dioximes is preferably effected in a solvent medium, which is a common solvent for the nitroparaffin and alkali or the resulting nitroparaffin salt, and in which the dioxime is relatively insoluble. Water constitutes a very satisfactory solvent medium, especially for the production of dioximes from the lower nitroparaffins. It is obvious, however, that other solvents having the above characteristics may be employed in place of water. The amount of solvent to be employed is not critical. I have effected the reaction in the absence of any solvent, and in the presence of water in amounts varying from one-fourth mole of water per mole of nitroparaffin to fifty moles of water per mole of nitroparaffin, obtaining dioximes in all cases. I prefer, however, to employ from 0.25 to 5.0 moles of water per mole of nitroparaffin, in most cases.

The production of the dioximes should be effected at relatively low temperatures, i. e., below 50° C., and preferably at temperatures of −10° C. to +30° C. Low temperatures facilitate stopping the reaction at the dioxime stage, especially in the case of the lower molecular weight nitroparaffins. When reacting low molecular weight nitroparaffins, and especially nitroethane, I prefer to employ temperatures below ordinary room temperatures. The formation of the dioximes is evidenced by the appearance of a crystalline precipitate, whereas the isoxazoles prepared from the lower nitroparaffins are oily liquids which, in the presence of sufficient water or other immiscible solvent, will constitute a second liquid phase. The reaction temperature is therefore maintained sufficiently low to prevent the formation of isoxazoles, and sufficiently high to secure a reasonable reaction rate of formation of the crystalline dioximes. Unduly low temperatures will of course result in reaction rates so low as to be undesirable from a commercial standpoint.

The reaction may be effected simply by mixing the nitroparaffin and alkaline converting agent, with or without a solvent, and allowing the mixture to stand at reaction temperature until the reaction is complete, as evidenced by the formation of no further crystalline precipitate. The reaction can, however, be initiated at a somewhat higher temperature than the desired reaction temperature, and then cooled to reaction temperature for the completion of the reaction. Thus I have allowed reaction mixtures of this type to stand at room temperature for an initial period, and then completed the reactions at approximately 0° C.

Any of the primary nitroparaffins which contain more than one carbon atom may be transformed into dioximes by my process. Mixed nitroparaffins may be employed if desired, but the resulting mixture of the various possible dioximes will present difficulties in separating the pure products, and I therefore prefer to use a single nitroparaffin to produce a single symmetrical dioxime.

The dioximes, obtained as described above, have the following type formula:

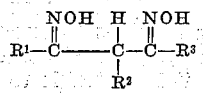

in which $R^1$, $R^2$ and $R^3$ represent alkyl groups, and preferably the same alkyl group. These compounds are white crystalline substances which may be purified easily by recrystallization from methanol or other suitable solvent. These compounds, having two reactive groups, are useful in organic synthesis for other purposes as well as for the production of isoxazoles.

The dioximes may be hydrolyzed to produce the corresponding isoxazoles by either acid or alkaline hydrolysis. I prefer, however, to utilize acid hydrolysis for this purpose. This reaction may be represented by the following equation:

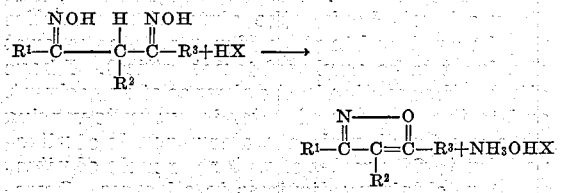

I have found that this reaction proceeds in most cases with quantitative yields of both isoxazole and hydroxylammonium salt.

The hydrolysis of these dioximes may be effected in accordance with known procedures for the hydrolysis of other oximes, and my invention is not limited to specific procedures for this step of the process. I prefer, however, to carry out the hydrolysis by means of relatively dilute aqueous solutions of a mineral acid, for example, sulfuric acid of 1 N to 5 N concentration. This reaction may suitably be carried out at the reflux temperature of the mixture, and the conclusion of the reaction is evidenced by the disappearance of the crystalline dioxime and the appearance of the isoxazole in the form of an oily layer constituting a second liquid phase. This oily layer may be recovered by decantation, and constitutes relatively pure isoxazole if purified dioxime is employed in the reaction. The isoxazole thus obtained may be further purified by vacuum distillation, if desired. The aqueous layer of the reaction product contains the hydroxylammonium salt which may be recovered by evaporation and crystallization.

My invention may be further illustrated by the following specific examples:

*Example I*

Nitroethane, diethylamine and water were mixed in the ratio of 1 mole of nitroethane, 1 mole of diethylamine and one-fourth mole of water, and the mixture was allowed to stand at 0° C. Crystallization of the dioxime was initiated by seeding, and at the conclusion of crystal formation, the crystals were separated by filtration and purified by successive recrystallizations from methanol.

The crystals thus obtained constituted 3-methyl-2,4-pentanedione dioxime (melting point 132° C.; nitrogen content 19.64%; theoretical nitrogen content 19.44%). This product was also obtained utilizing n-propylamine as the alkaline condensation agent, and the two products were found to be identical by determining the melting point of a mixture of the products.

The purified dioxime thus obtained was converted to 3,4,5-trimethylisoxazole by refluxing with dilute sulfuric acid. The hydroxylamine obtained as the second product of this hydrolysis amounted to 23.2% by weight of the dioxime (theoretical 22.9%), indicating 94.5% conversion of the dioxime to the isoxazole.

*Example II*

A mixture of 1-nitropropane, n-propylamine and water, in the ratio of one mole of nitropropane, one mole of n-propylamine and one-fourth mole of water was prepared and allowed to stand at room temperature. Crystallization ensued without seeding, and at the conclusion of crystal growth the mixture was cooled to 0° C., and filtered. The crystals were washed with water, and the wash water was added to the mother liquor, the resulting mixture being cooled to 0° C. to secure a second crop of crystals. The product, 4-ethyl-3,5-heptanedione dioxime, was obtained in a yield of 58% of the theoretical yield. After purification by recrystallization from methanol the product was found to have a melting point of 135.2–135.6° C. This product was also prepared by the use of ammonia, n-butylamine, and 2-aminoheptane as the alkaline condensation agents, and in each case was found by the determination of a mixed melting point to be identical with the above product.

The dioxime, prepared as above described, was refluxed for 4 hours with approximately twice its weight of 3 N sulfuric acid. The resulting oily layer was separated by decantation and washed with water. This material, which constituted 3,4,5-triethylisoxazole, was obtained in an apparent yield of 102% of the theoretical yield. A determination of hydroxylamine in the aqueous layer of the product indicated a theoretical yield of the hydroxylammonium salt.

The isoxazole was vacuum distilled and identified as 3,4,5-triethylisoxazole by the following properties:

Nitrogen content__ per cent__ 9.17 (theoretical 9.15)
Boiling point, 760 mm._____ 215.3° C.
Specific gravity, 20°/20°_____ 0.9363
Refractive index $n_D^{20}$_____ 1.45803

*Example III*

A mixture of 1-nitrobutane, n-butylamine, and water, in the proportions of 1 mole of 1-nitrobutane, 1 mole of n-butylamine, and one-fourth mole of water was allowed to stand at room temperature. Crystal formation ensued without seeding, and at the conclusion of crystal growth the mixture was cooled to 0° C., and allowed to stand at this temperature until the conclusion of further crystal growth. The crystals were recovered by filtration, and the mother liquor was again cooled to 0° C., to obtain a second crop of crystals. The product, 5-propyl-4,6-nonanedione dioxime, was obtained in a yietld of 37% of the theoretical yield. After recrystallization from methanol this compound was found to have a melting point of 116.4–116.8° C., and a nitrogen content of 12.19% (theoretical 12.27%).

The dioxime prepared as described above was refluxed for 6 hours with approximately six times its wetight of 2 N sulfuric acid. The resulting oily layer was separated by decantation and washed with water. This product, constituting 3,4,5-tripropylisoxazole, was obtained in an apparent yield of 102% of the theoretical yield. A determination of hydroxylamine in the aqueous layer of the product indicated a yield of 96% of the theoretical yietld of hydroxylamine sulfate.

The 3,4,5-tripropylisoxazole was further purified by vacuum distillation, and was found to have the following properties:

| | |
|---|---|
| Nitrogen content, per cent | 7.11 (theoretical for tripropyl isoxazole 7.16) |
| Boiling point, 760 mm | 255.2–255.6° C. |
| Specific gravity, 20°/20° | 0.9128 |
| Refractive index $n_D^{20}$ | 1.46088 |

It is to be understood, of course, that the above examples are merely illustrative, and do not limit the scope of my invention. My invention is generally applicable to the production of dioximes and isoxazoles from any of the primary nitroparaffins (1-nitroalkanes) containing more than one carbon atom. As has previously been pointed out, other alkaline condensation agents might be employed in place of the specific amines employed in the examples, and the reaction conditions utilized in the examples could be varied in numerous respects. In general it may be said that the use of any equivalents or modifications of procedure which would naturally occur to those skilled in the art, is included within the scope of my invention.

My invention now having been described, what I claim is:

1. In a process for the production of isoxazoles from 1-nitroalkanes containing more than one carbon atom, the steps which comprise condensing said 1-nitroalkanes in the presence of an ammonia base, at a temperature sufficiently low to prevent substantial isoxazole formation, and subjecting the resulting crystalline product to hydrolysis.

2. In a process for the production of an isoxazole from a 1-nitroalkane containing from 2 to 4 carbon atoms, the steps which comprise condensing said 1-nitroalkane in the presence of an aqueous solution of an alkylamine, at a temperature of −10° C. to +30° C., purifying the resulting dioxime, and subjecting said dioxime to acid hydrolysis to form the corresponding isoxazole.

3. A process for the production of dioximes from 1-nitroalkanes containing more than 1 carbon atom, which comprises condensing said 1-nitroalkanes in the presence of an ammonia base, at a temperature sufficiently low to prevent substantial isoxazole formation.

4. A process for the production of a dioxime from a 1-nitroalkane containing from 2 to 4 carbon atoms, which comprises condensing said 1-nitroalkane in the presence of an aqueous solution of an alkylamine at a temperature of −10° C. to +30° C.

SAMUEL B. LIPPINCOTT.